US012568159B2

(12) United States Patent
Yao et al.

(10) Patent No.: US 12,568,159 B2
(45) Date of Patent: Mar. 3, 2026

(54) COMMUNICATION SYSTEM, COMMUNICATION METHOD, AND RELATED APPARATUS

(71) Applicant: Shenzhen Yinwang Intelligent Technologies Co., Ltd., Shenzhen (CN)

(72) Inventors: Zhiming Yao, Shenzhen (CN); Jie Li, Hangzhou (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 18/773,905

(22) Filed: Jul. 16, 2024

(65) Prior Publication Data

US 2024/0372933 A1 Nov. 7, 2024

Related U.S. Application Data

(63) Continuation of application No. PCT/CN2022/072301, filed on Jan. 17, 2022.

(51) Int. Cl.
H04L 69/22 (2022.01)
H04L 45/74 (2022.01)
H04L 49/00 (2022.01)

(52) U.S. Cl.
CPC .............. H04L 69/22 (2013.01); H04L 45/74 (2013.01); H04L 49/3009 (2013.01); H04L 49/3081 (2013.01)

(58) Field of Classification Search
None
See application file for complete search history.

(56) References Cited

U.S. PATENT DOCUMENTS

| | | | |
|---|---|---|---|
| 10,230,544 B1 | 3/2019 | Mcdowell et al. | |
| 10,931,588 B1 | 2/2021 | Matthews et al. | |

FOREIGN PATENT DOCUMENTS

| | | |
|---|---|---|
| CN | 111416778 A | 7/2020 |

*Primary Examiner* — Davoud A Zand
(74) *Attorney, Agent, or Firm* — Conley Rose, P.C.

(57) ABSTRACT

A communication system includes a connection module, a processing module, and K nodes. The connection module is configured to connect the processing module and the K nodes. The processing module includes L communication units, where each of the L communication units corresponds to one node, the L communication units include a first communication unit, and the K nodes include a first node. The first communication unit is configured to process a packet of the first node that corresponds to the first communication unit.

20 Claims, 8 Drawing Sheets

Communication system 10

Communication system 10

COMMUNICATION SYSTEM, COMMUNICATION METHOD, AND RELATED APPARATUS

CROSS-REFERENCE TO RELATED APPLICATIONS

This is a continuation of International Patent Application No. PCT/CN2022/072301 filed on 17 Jan. 2022, which is hereby incorporated by reference in its entirety.

TECHNICAL FIELD

This disclosure relates to the field of communication technologies, and in particular, to a communication system, a communication method, and a related apparatus.

BACKGROUND

In a communication system including a plurality of nodes, configuring different addresses for different nodes is a basis for implementing multi-node communication. When the plurality of nodes in the communication system have different models, matching between models and addresses of the nodes is further required. Such a communication manner requires complex communication configuration and management transactions, leading to an increase in costs of communication system configuration and affecting efficiency of a communication establishment process.

As services provided by a vehicle are diversified, a quantity and a type of nodes in the vehicle are increasing, and a higher requirement is imposed on an onboard communication capability. A sensor system of the vehicle is used as an example. A gateway in the vehicle is interconnected with a plurality of sensors and a plurality of processing modules to support communication between the sensors and the processing modules. In a communication process, packets of different sensors and processing modules do not interfere with each other. To meet the foregoing requirement, the complex communication configuration and management transactions are required before communication. For example, the sensors need to be configured with different communication addresses to avoid a conflict, installation positions of the sensors need to be marked separately, and the plurality of sensors need to be marked with different models for differentiation. Such complex configuration work can increase management costs, and affects the efficiency of the communication establishment process, leading to poor user experience.

SUMMARY

Embodiments of this disclosure provide a communication system, a communication method, and a related apparatus, to reduce communication costs and improve efficiency of communication connection establishment.

According to a first aspect, an embodiment of this disclosure provides a communication system. The communication system includes a connection module, a processing module, and K nodes.

The connection module is configured to connect the processing module and the K nodes.

The processing module includes L communication units, where each of the L communication units corresponds to one node, the L communication units include a first communication unit, and the K nodes include a first node.

The first communication unit is configured to process a packet of the first node.

K and L are integers greater than 0.

In the communication system, the processing module does not need to differentiate between nodes, and may differentiate between source nodes of packets by using different communication units. In other words, virtualization processing and isolation are performed on different nodes, or packets of the different nodes are differentiated by using the communication units, so as to avoid complex configuration of the nodes, save communication time, and improve communication efficiency.

Optionally, there may be a plurality of nodes, and there may also be a plurality of communication units. For example, there are two nodes (referred to as a first node and a second node for ease of differentiation) and there are two communication units (referred to as a first communication unit and a second communication unit for ease of differentiation). The first communication unit is configured to process a packet of the corresponding first node, and the second communication unit is configured to process a packet of the corresponding second node.

Optionally, there may also be a plurality of processing modules. For example, the communication system includes three processing modules (referred to as a first processing module, a second processing module, and a third processing module for ease of differentiation). The first processing module may include L1 communication units, the second processing module may include L2 communication units, and the third processing module may include L3 communication units, where L1, L2, and L3 may be the same or may be different.

In a possible implementation of the first aspect, the processing module may be a module with a centralized computing capability, for example, a central processing unit (CPU), a domain controller (DC), a human-machine interaction (HMI), or a gateway (GW).

In a possible design, the communication system may be located in a mobile terminal, or some nodes in the communication system are located in the mobile terminal. The mobile terminal may be an intelligent terminal or a transportation means such as a vehicle, a robot, or an unmanned aerial vehicle.

For example, the communication system may be located in the vehicle, and the node may be a sensor in the vehicle, for example, one or more of a radar, a lidar, a camera, a screen, or a microphone. The processing module may be a cockpit domain controller (CDC), a vehicle control unit (VCU), a zone integration unit (such as vehicle integration unit (VIU)), a telematics box (T-box or TCU), another apparatus with a computing capability, or the like in the vehicle.

In another possible implementation of the first aspect, the first communication unit may be a virtual device instance. Further, the L communication units may be L virtual device instances.

In another possible implementation of the first aspect, the connection module may be an apparatus for packet forwarding, for example, a switch or a route.

In another possible implementation of the first aspect, the first communication unit is configured to listen to a packet from the corresponding first node.

In another possible implementation of the first aspect, the first communication unit is configured to send a packet destined for the corresponding first node.

In another possible implementation of the first aspect, the connection module includes M ports, where M is an integer greater than 1. The connection module connects the processing module and the node through the M ports. For example, one node accesses one port, and one processing module also accesses the one port.

In another possible implementation of the first aspect, the first node accesses the connection module through a first port of the M ports.

In another possible implementation of the first aspect, the connection module is further configured to add a packet identifier to a packet that passes through the connection module.

The packet identifier may be used to differentiate between packets related to the different nodes. For example, the first node corresponds to the first port, the first port corresponds to a first identifier, and the first communication unit corresponds to the first identifier.

Because each node accesses the connection module through a port, one port corresponds to one node connected to the port, and there is a one-to-one correspondence between a port of each connection node and an identifier. Further, each port corresponds to a different identifier. For example, the K nodes include the first node and the second node. A port A is used for access of the first node, and a port B is used for access of the second node. The port A may correspond to an identifier A, and the port B may correspond to an identifier B.

In this way, the connection module may add the identifier A to a packet from the first node (or add the identifier A to a packet sent to the first node). Similarly, the connection module may add the identifier B to a packet from the second node (or add the identifier B to a packet sent to the node). Because identifiers of the packets related to the different nodes are different, communication isolation between the different nodes may be implemented through the packet identifiers.

In another possible implementation of the first aspect, a packet identifier added to a first packet from the first node is the first identifier, and the first communication unit is configured to listen to the first packet whose packet identifier is the first identifier. In another possible implementation of the first aspect, a destination Internet Protocol (IP) address of the first packet is an IP address of the processing module.

In another possible implementation of the first aspect, a destination IP address of the first packet is a multicast address or a broadcast address, and the connection module is further configured to obtain N first packets based on the first packet, and forward the N first packets to a port corresponding to the destination IP address.

N is an integer, and N>0 or N≥0.

In another possible implementation of the first aspect, a packet identifier added to a second packet from the first communication unit is the first identifier, and the connection module is further configured to send the second packet to the first node based on the first identifier through the first port.

In another possible implementation of the first aspect, a local IP address of the second packet is an IP address of the first communication unit.

An IP address of a sender of a packet from the local IP address may also be referred to as a source IP address. In addition, the local IP address corresponds to a peer IP address. The peer IP address is used to indicate a receiver of the packet or an address at which the packet arrives next, and is also referred to as the destination IP address.

In another possible implementation of the first aspect, K is an integer greater than 1, and IP addresses of the K nodes are the same.

In this embodiment of this disclosure, because packets from the different nodes are isolated through the packet identifiers, there is no need to differentiate between the different nodes through an IP address. Certainly, the IP addresses of the K nodes may also be completely the same or partially the same, or may be different.

In another possible implementation of the first aspect, the processing module is further configured to receive a configuration information packet from the first node, where the configuration information packet includes an IP address of the first node, and create the first communication unit, where the first communication unit is configured to correspond to the first node.

Further, the first node accesses the connection module through the first port of the connection module, and the configuration information packet further includes indication information about the first port.

According to a second aspect, an embodiment of this disclosure provides a communication method. The method is applied to a communication system including a connection module, a processing module, and K nodes. The processing module includes L communication units, where each of the L communication units corresponds to one node, the L communication units include a first communication unit, and the K nodes include a first node.

The method includes that the connection module connects the processing module and the K nodes, and the processing module processes a packet of the first node by using a first processing unit.

K and L are integers greater than 0.

In a possible implementation of the second aspect, the processing module may be a module with a centralized computing capability, such as a CPU, a DC, an HMI, or a GW.

In a possible design, the communication system may be located in a mobile terminal, or some nodes in the communication system are located in the mobile terminal. The mobile terminal may be an intelligent terminal or a transportation means such as a vehicle, a robot, or an unmanned aerial vehicle.

For example, the communication system may be located in the vehicle, and the node may be a sensor in the vehicle, for example, one or more of a radar, a lidar, a camera, a screen, or a microphone. The processing module may be a CDC, a VCU, a VIU, a T-box, another apparatus with a computing capability, or the like in the vehicle.

In another possible implementation of the second aspect, the first communication unit may be a virtual device instance.

In another possible implementation of the second aspect, the connection module may be an apparatus for packet forwarding, for example, a switch, or a router.

In another possible implementation of the second aspect, that the processing module processes a packet of the corresponding first node by using a first communication unit includes the processing module listens to a packet from the corresponding first node by using the first communication unit, and/or the processing module sends a packet destined for the corresponding first node by using the first communication unit.

In another possible implementation of the second aspect, the connection module includes M ports, where M is an integer greater than 1. The connection module connects the processing module and the node through the M ports. For example, one node accesses one port, and one processing module also accesses the one port.

In another possible implementation of the second aspect, the first node accesses the connection module through a first port of the M ports.

In another possible implementation of the second aspect, the method further includes that the connection module adds a packet identifier to a packet that passes through the connection module, where the first node corresponds to the first port, the first port corresponds to a first identifier, and the first communication unit corresponds to the first identifier.

In another possible implementation of the second aspect, a packet identifier added to a first packet from the first node is the first identifier.

The method further includes that the processing module listens to, by using the first communication unit, a packet whose packet identifier is the first identifier.

In another possible implementation of the second aspect, a destination IP address of the first packet is an IP address of the processing module.

In another possible implementation of the second aspect, the destination IP address of the first packet is a multicast address or a broadcast address.

The method further includes that the connection module obtains N first packets based on the first packet, and forwards the N first packets to a port corresponding to the destination IP address.

N is an integer, and N>0 or N≥0.

In another possible implementation of the second aspect, a packet identifier added to a second packet from the first communication unit is the first identifier.

The method further includes that the connection module sends the second packet to the first node based on the first identifier through the first port.

In another possible implementation of the second aspect, a local IP address of the second packet is an IP address of the first communication unit.

In another possible implementation of the second aspect, K is an integer greater than 1, and IP addresses of the K nodes are the same.

In another possible implementation of the second aspect, the method further includes that the processing module receives a configuration information packet from the first node, where the configuration information packet includes the IP address of the first node, and the processing module creates the first communication unit, where the first communication unit is configured to correspond to the first node.

Further, the first node accesses the connection module through the first port of the connection module, and the configuration information packet further includes indication information about the first port.

According to a third aspect, an embodiment of this disclosure provides a processing module, where the processing module includes one or more communication units, and the processing module is configured to implement a method on a processing module side in the method described in any one of the implementations of the second aspect.

According to a fourth aspect, an embodiment of this disclosure provides a node. The node is configured to implement a method on a first node side in the method described in any implementation of the second aspect.

In a possible design, the node may include a sending unit and a receiving unit. Optionally, the node further includes one or more of a processing unit, a sensing unit, and an output unit.

The sending unit may be configured to implement the operations such as sending or forwarding in any one of the implementations of the second aspect, and the receiving unit may be configured to implement the operations such as receiving or listening in any one of the implementations of the second aspect. The processing unit may be configured to implement the operations such as determining, calculating, generating, or replicating in any one of the implementations of the second aspect, and/or be configured to support another process such as packet output in the foregoing implementations. The sensing unit is configured to obtain sensing information, including but not limited to one or more of an image, a sound, a distance, a speed, light, temperature, or the like. The output unit is configured to implement data output, including but not limited to one or more of displaying, printing, sound playing, peripheral device operation controlling, or the like.

According to a fifth aspect, an embodiment of this disclosure provides a connection module, where the connection module is configured to implement a method on a connection module side in the method described in any one of the implementations of the second aspect.

Optionally, the connection module may further include a sending unit, a receiving unit and a processing unit. The sending unit may be configured to implement the operations such as sending or forwarding in any one of the implementations of the second aspect, and the receiving unit may be configured to implement the operations such as receiving or forwarding in any one of the implementations of the second aspect. The processing unit may be configured to implement the operations such as determining, calculating, generating, or replicating in any one of the implementations of the second aspect.

According to a sixth aspect, an embodiment of this disclosure provides a communication apparatus. The communication apparatus includes a processor and a memory. The memory stores a computer program. When the processor executes the computer program, the communication apparatus performs the method according to any one of the implementations of the second aspect.

Optionally, the communication apparatus may be the processing module, the node, and/or the connection module in any one of the implementations of the second aspect.

It should be noted that the processor included in the communication apparatus described in the sixth aspect may be a processor (referred to as a dedicated processor for ease of differentiation) dedicated to performing these methods, or may be a processor that invokes a computer program to perform these methods, for example, a general-purpose processor. Optionally, at least one processor may further include both a dedicated processor and a general-purpose processor.

Optionally, the computer program may be stored in the memory. For example, the memory may be a non-transitory memory, for example, a read-only memory (ROM). The memory and the processor may be integrated on a same component, or may be separately disposed on different components. A type of the memory and a manner of disposing the memory and the processor are not limited in this embodiment of this disclosure.

In a possible implementation, the at least one memory is located outside the communication apparatus.

In another possible implementation, the at least one memory is located inside the communication apparatus.

In another possible implementation, some of the at least one memory are located inside the communication apparatus, and the others are located outside the communication apparatus.

In this disclosure, the processor and the memory may further be integrated into one component. In other words, the processor and the memory may further be integrated together.

According to a seventh aspect, an embodiment of this disclosure provides a computer-readable storage medium. The computer-readable storage medium stores instructions. When the instructions are run on at least one processor, the method described in the second aspect is implemented.

According to an eighth aspect, this disclosure provides a computer program product. The computer program product includes computer instructions. When the instructions are run on at least one processor, the method described in the second aspect is implemented.

Optionally, the computer program product may be a software installation package. If the foregoing method needs to be used, the computer program product may be downloaded and executed on a computing device.

For beneficial effects of the technical solutions provided in the second to the eighth aspects of this disclosure, refer to beneficial effects of the technical solution in the first aspect. Details are not described herein again.

BRIEF DESCRIPTION OF DRAWINGS

The following briefly describes accompanying drawings used in descriptions of embodiments.

DESCRIPTION OF EMBODIMENTS

Figure 1:
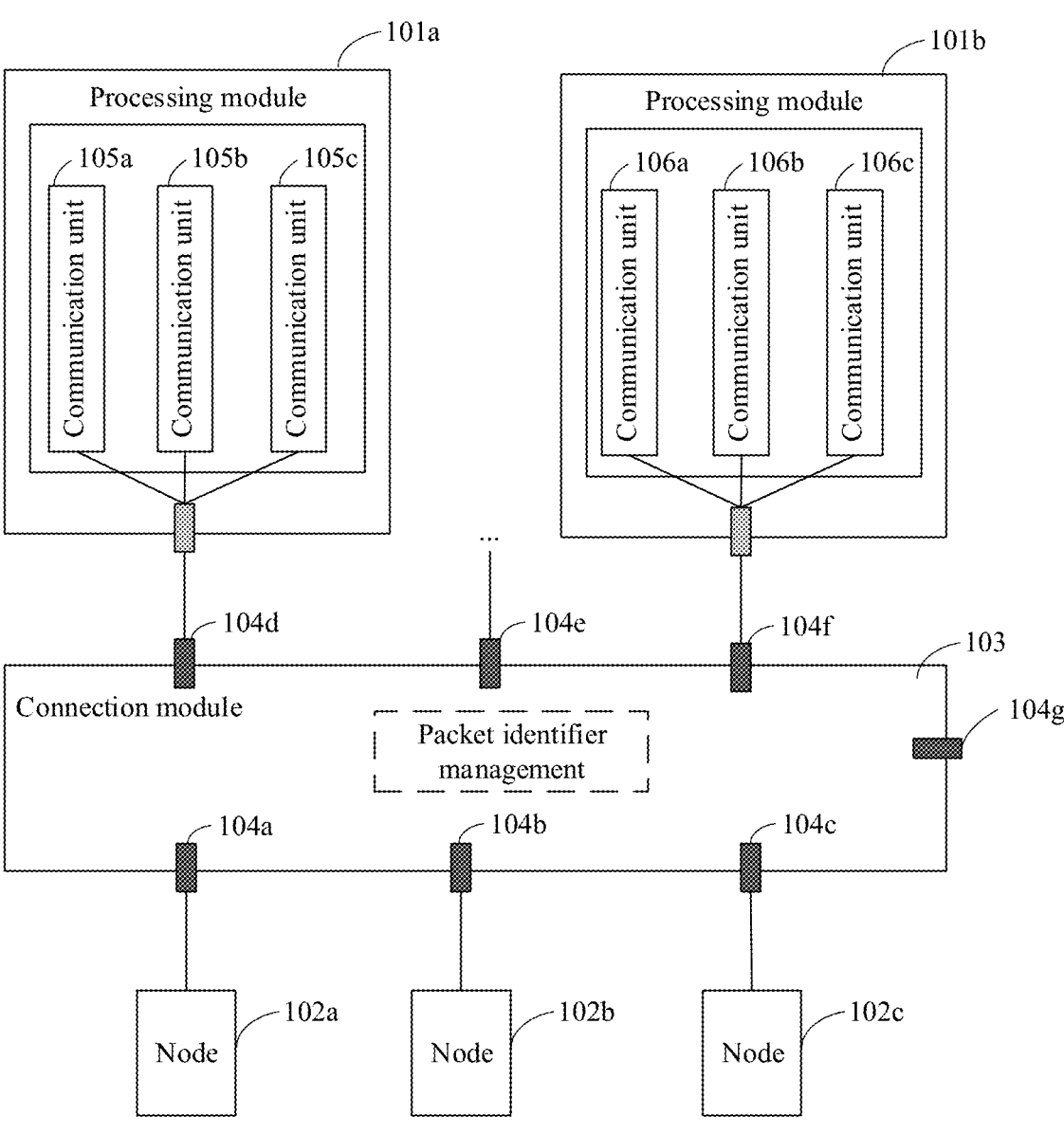
FIG. 1 is a schematic diagram of an architecture of a communication system according to an embodiment of this disclosure.

The following describes embodiments of this disclosure in detail with reference to accompanying drawings.

For ease of understanding, some concepts related to the embodiments of this disclosure are described for reference by using examples below. Details are as follows:

1. Socket:

A socket is an abstraction of an endpoint for bidirectional communication between application processes on different hosts in a network.

One socket is one end of process communication on the network, and provides a mechanism for a process on an application layer to exchange data by using a network protocol. In terms of a status of the socket, the socket is connected to an application process upstream and a network protocol stack downstream. The socket is an interface for communication between applications through the network protocol and an interface for interaction between an application and the network protocol stack.

2. Scalable Service-Oriented Middleware Over IP (SOME/IP)

SOME/IP is a concept introduced in onboard Ethernet communication, and is located above Layer 4 of an Open Systems Interconnection (OSI) 7-layer model. The SOME/IP is sent only when required by a receiver. An advantage of this method is that a bus does not contain too much unnecessary data, thus reducing a load.

In a network, a node sometimes needs to invoke a service implemented on another node. In this case, a transmitting end and a receiving end play roles of a client and a server respectively. The SOME/IP is an interface for implementing such remote service invocation.

3. Node:

A node is an electronic device that has a communication capability and/or a computing capability, and is also referred to as a communication node or a computing node. For example, the node may include an independent device such as a handheld terminal, a vehicle, a vehicle-mounted device, a network side device, user equipment, an access terminal, a subscriber unit, a subscriber station, a mobile station, a mobile console, a remote station, a remote terminal, a wireless communication device, a user agent, or a user apparatus, or may be a part (for example, a chip or an integrated circuit) included in the independent device.

For example, when the node is the vehicle-mounted device, the node may be one or more of a module such as a sensor (for example, a camera, a lidar, or a millimeter-wave radar), a screen, a microphone, a speaker, an electronic key, and a keyless entry or start system controller. In the vehicle, the node may further be a battery management system and a battery in a battery pack.

The node in the embodiments of this disclosure may be applied to a plurality of application scenarios, such as the mobile internet, the internet of vehicles, industrial control, unmanned driving, transportation safety, the Internet of things (IoT), a smart city, or a smart home.

In some application scenarios or some network types, a device with a similar communication capability and/or computing capability may alternatively not be referred to as a node. However, for ease of description, an electronic device with a similar communication capability and/or computing capability is collectively referred to as a node in the embodiments of this disclosure.

The foregoing example descriptions of the concepts may be applied in the following embodiments.

The following describes an application scenario and a system architecture in the embodiments of this disclosure.

FIG. 1 is a schematic diagram of an architecture of a communication system 10 according to an embodiment of this disclosure. The communication system 10 includes processing modules, a connection module, and nodes. It should be understood that optionally, there may be one or more processing modules. For example, the processing module may include a processing module 101a, a processing module 101b, and the like.

Similarly, there may be one or more nodes. For ease of description, in this disclosure, a quantity of nodes is set to K, where K is an integer greater than 0. A node may be, for example, referred to as a first node. It should be understood that the first node and the like are merely used to facilitate description of the node, and do not indicate that a sequence number, a communication sequence, and a number of the node are limited. For example, in the communication system shown in FIG. 1, there may be three nodes, including a node 102a, a node 102b, and a node 102c.

The following describes parts in the communication system 10.

(1) The processing module is a communication endpoint in the communication system 10. The processing module may access a connection module 103, and communicate with another node by using the connection module 103. For example, the processing module may receive a packet from the node or send a packet to the node by using the connection module 103.

In a possible design, the processing module has a computing capability, and can process data.

In a possible design, the processing module may include any quantity of units with computing functions. For example, a processing module may include one or more of the following functional units: a CPU, an application processor (AP), a graphics processing unit (GPU), a microprocessing unit (MPU), an application-specific integrated circuit (ASIC), an image signal processor (ISP), a digital signal processor (DSP), a field-programmable gate array (FPGA), a complex programmable logic device (CPLD), a coprocessor (for assisting the CPU in completing corresponding processing and application), a microcontroller unit (MCU), a neural network processing unit (NPU), and/or the like.

In another possible design, the processing module may be a CDC, a VCU, a GW, an HMI, a VIU, a T-box, another apparatus with a computing capability, or the like in the vehicle.

In another possible design, the processing module is included in an electronic control unit (ECU) of the vehicle. For example, the processing module may be a processor in the ECU, and is configured to process data from the node.

(2) The node is another communication endpoint in the communication system 10. The node may access the connection module 103, and communicate with the connection module and the other node by using the connection module 103.

In some scenarios, the node may include a detection apparatus, an output apparatus, and the like.

The detection apparatus, which may also be referred to as a sensor, can collect detected information, and form the collected information into an electrical signal or another required form for output. For example, the node includes but is not limited to a radar, a lidar, a camera, a temperature sensor, an optical sensor, or the like.

The output apparatus may implement data output, such as displaying, printing, sound playing, and peripheral device operation controlling. For example, the node includes but is not limited to a display, a printer, a speaker, a disk, or the like.

(3) The connection module 103 may be connected to the processing module and the node, to provide a communication path for the processing module and the node.

Further, for example, communication data is a packet, and the connection module 103 may forward the packet. For example, a packet from the node 102a is forwarded to the processing module 101a, and the like.

Optionally, the connection module 103 has M ports, where M is an integer greater than 1. As shown in FIG. 1, a port of the connection module 103 is, for example, a port 104a, a port 104b, a port 104c, 104d, a port 104e, a port 104f, and a port 104g. Another apparatus may be connected to the connection module 103 through the ports, and the connection module 103 provides a path between the ports. For example, the processing module 101a is connected to the connection module 103 through a port 104d, the node 102a is connected to the connection module 103 through the port 104a, and the connection module 103 may form a path between the processing module 101a and the node 102a.

In a design, the connection module 103 may include a switch, a router, and the like. For example, the connection module 103 may include a local area network (LAN) switch.

In a possible solution, the processing module and the connection module may be integrated or independent. For example, the VIU in the vehicle includes the LAN switch and a plurality of CPUs, where the plurality of CPUs may be considered as a plurality of processing modules, and the LAN switch may be considered as the connection module. For another example, the connection module 103 and the processing module may be integrated into the ECU, and the connection module 103 may be an Ethernet switch inside the ECU, and is configured to connect the processing module and the node through the Ethernet (ETH).

It should be understood that an apparatus such as the node or the switch in this embodiment of this disclosure may be a physical apparatus, or may be a virtual apparatus, or may be partially the physical apparatus and partially the virtual apparatus. For example, the connection module 103 may include a virtual switch, a virtual router, or the like. In addition, the system shown in FIG. 1 is merely an example. A quantity of processing modules, a quantity of nodes, and a quantity of connection modules are also a possible case shown for ease of description, and are not used as a limitation on the communication system.

The node communicates with the processing module by using the connection module 103. For example, the node and the processing module communicate in a form of a packet. A packet from the node is sent to one or more processing modules by using the connection module 103. Similarly, a packet from the processing module is sent to one or more nodes by using the connection module 103. In a communication process, to make packets of different nodes and processing modules not interfere with each other, complex communication configuration and management transactions are required before communication between the node and the processing module. For example, because the packet is forwarded through a communication address, different communication addresses need to be configured for the node 102a and the node 102b before communication, so that the packet can be correctly sent to the node that requires the communication.

For another example, a same node is installed at different locations, and a function performed by the same node may be different. In a vehicle using a plurality of radars, the radars at different locations in the vehicle may use different occasions, weights, and manners for calculation. Therefore, a location of the node needs to be bound to the node.

In conclusion, complex configuration work of the node in the communication system increases management costs, and affects efficiency of a communication establishment process, leading to poor user experience.

In view of this, this embodiment of this disclosure provides a communication method, and a related apparatus, to reduce communication costs and improve efficiency of communication connection establishment.

In the communication system provided in this embodiment of this disclosure, the processing module includes one or more communication units. For ease of description, in this disclosure, a quantity of communication units in the processing module is set to L, where L is an integer greater than 0. As shown in FIG. 1, the communication units included in the processing module 101*a* are, for example, a communication unit 105*a*, a communication unit 105*b*, and a communication unit 105*c*, and the communication units included in the processing module 101*b* are, for example, a communication unit 106*a*, a communication unit 106*b*, a communication unit 106*c*, and the like. Optionally, the communication unit may include a virtual device example, a data processing instance, or the like.

There is a one-to-one correspondence between the communication unit and the node, and the communication unit is configured to process a packet of a node corresponding to the communication unit. For example, the communication unit 105*a* in the processing module 101*a* is configured to process a packet of the corresponding node 102*a*, and the communication unit 105*b* in the processing module 101*a* is configured to process a packet of the corresponding node 102*b*. Other cases can be deduced by analogy. In this way, the processing module does not need to differentiate between the nodes, and packets of different nodes can be differentiated by using the communication unit. In other words, the processing module performs virtualization processing on the different nodes by using the communication units, and isolates the packets of the different nodes by using different communication units, so as to avoid complex configuration of the nodes, save communication time, and improve communication efficiency.

In a possible design, the processing module may include a communication protocol stack for performing communication protocol processing and support communication between the nodes. For example, the communication protocol stack in the processing module includes but is not limited to one or more of a Transmission Control Protocol (TCP)/IP stack, an SOME/IP, and the like.

Further optionally, the processing module may implement a plurality of independent protocol stacks through the socket. A conflict of information about an IP address among a plurality of protocol stacks does not affect a function of the protocol stacks because the IP address is unique in each of the independent protocol stacks. In this way, each communication unit may correspond to one independent protocol stack. The communication units may establish virtual connections to the different nodes through the independent protocol stacks, and communication between the processing module and the node is performed on the virtual connection, thereby achieving an objective of configuration-free communication.

It should be noted that the one-to-one correspondence does not indicate that the quantity of communication units is completely the same as the quantity of nodes. Instead, the one-to-one correspondence is used to indicate that one communication unit corresponds to one node. In a specific implementation process, a node may not have a corresponding communication unit. For example, the processing module temporarily does not need to communicate with a node X. Therefore, there can be no communication unit corresponding to the node X in the processing module. For another example, the node X is a newly accessed node, and has not submitted configuration information to the processing module. Therefore, the processing module does not create a communication unit corresponding to the node X.

In a possible implementation, the communication system may isolate the packets of the different nodes through identifiers added to the packets, a value of a field in the packets, or the like.

The following describes solutions of this disclosure by using an example in which the packets of the different nodes are differentiated by adding packet identifiers. Different packet identifiers may be added to packets from different ports (for example, ports connected to the nodes). Because one node accesses one port, the packets from the different nodes may be differentiated through the packet identifiers.

Table 1 is a table of possible correspondences provided in this embodiment of this disclosure. The communication system shown in FIG. 1 is used as an example. Correspondences among the packet identifiers, the ports, the nodes, and the communication units are shown in Table 1. It may be learned that a node connected to the port 104*a* is the node 102*a*, a packet identifier corresponding to a packet from the port 104*a* is an "identifier A", and the communication unit 105*a* may be configured to process a packet whose packet identifier is the "identifier A". Similarly, a node connected to the port 104*b* is the node 102*b*, a packet identifier corresponding to a packet from the port 104*b* is an "identifier B", and the communication unit 105*b* may be configured to process a packet whose packet identifier is the "identifier B". Other packet identifiers are deduced by analogy. In this way, the packets of the different nodes can be isolated through the packet identifiers, and there is no need to allocate a different IP address to each node, thereby avoiding a complex configuration transaction.

TABLE 1

Table of correspondences among packet identifiers, ports, nodes, and communication units

| Packet identifier | Port | Node | Communication unit |
|---|---|---|---|
| Identifier A | 104a | 102a | 105a |
| Identifier B | 104b | 102b | 105b |
| Identifier C | 104c | 102c | 105c |
| . . . | . . . | . . . | . . . |

It should be understood that the foregoing describes the correspondences in a table form only for ease of understanding, but does not aim at an existence form of the correspondences. In a specific implementation process, the correspondences may also be recorded in another manner, for example, a linked list, a heap, a stack, or a database table. Examples are not provided herein one by one.

In a possible design, an apparatus for adding the packet identifier to the packet may be the connection module (the connection module 103 shown in the figure). Further, when there is a plurality of connection modules, any one of the plurality of connection modules may add the packet identifier to the packet. Alternatively, which connection module (or connection modules) adds the packet identifier to the packet is determined based on a preset value or a predefined rule.

For example, the connection module 103 may include a packet identifier management module. The packet identifier management module may add a packet identifier to a packet that passes through the connection module 103, and isolate packets related to the different nodes through the packet identifiers, so that the packets of the different nodes do not interfere with each other.

In the following, description is made by using an example in which the processing module sends a packet to the node. A node accessed by the port 104a is the node 102a, and a packet identifier corresponding to the port 104a is the "identifier A". When the node 102a sends the packet to the processing module 101a, the connection module 103 may add the "identifier A" to the packet from the node 102a. In the processing module 101a, the communication unit 105a is configured to listen to the packet whose packet identifier is the "identifier A". Similarly, a packet identifier corresponding to a packet from the node 102b is the "identifier B", and the communication unit 105b in the processing module 101a is configured to listen to the packet whose packet identifier is the "identifier B". Packets from other nodes are deduced by analogy.

In a possible design, when the processing module sends the packet to the node, the packet sent to the node is sent by using the corresponding communication units. When receiving the packet from the corresponding communication unit, the connection module adds a corresponding packet identifier to the packet. Further, the connection module forwards the packet to the corresponding node based on the packet identifier.

For example, when the processing module 101a needs to send a packet to the node 102a, the processing module 101a may send the packet by using the communication unit 105a, and the connection module 103 may add a corresponding packet identifier, which is the "identifier A", to the packet from the communication unit 105a. The connection module 103 forwards the packet whose packet identifier is the "identifier A" through the port 104a, so that the node 102a receives the packet. Similarly, when the processing module 101a needs to send a packet to the node 102b, the processing module 101a may send the packet by using the communication unit 105b, and the connection module 103 may add a corresponding packet identifier, which is the "identifier B", to the packet from the communication unit 105b. The connection module 103 forwards the packet whose packet identifier is the "identifier B" through the port 104b, so that the node 102b receives the packet.

Figure 2:
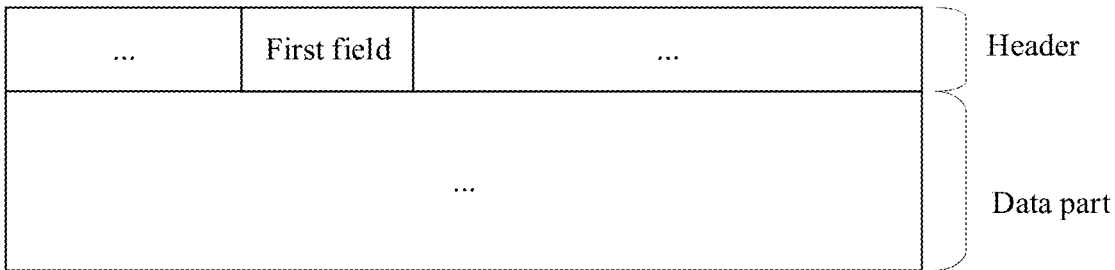
FIG. 2 is a schematic diagram of a packet format according to an embodiment of this disclosure.

The following describes the solutions of this disclosure by using an example in which a value of a field in the packet is used to differentiate between the packets of the different nodes. A packet usually includes a plurality of fields, and these fields indicate a type of information based on a predefined format and value. For example, FIG. 2 is a schematic diagram of a possible packet format according to an embodiment of this disclosure. The packet may include a header and a data part. The data part is used to carry transferred data, and the header is used to transfer additional information. The header of the packet may include a first field, and a value of the first field may have a correspondence with the port, the node, and the communication unit.

Table 2 is a table of possible correspondences among values of first fields, the ports, the nodes, and the communication units listed in this embodiment of this disclosure. It may be learned that the value of the first field of the packet from the port 104a is "00" (hexadecimal), and the communication unit 105a may be used for a packet of which the value of the first field is "00". Similarly, the value of the first field of the packet from the port 104b is "01" (hexadecimal), and the communication unit 105b may be used for a packet of which the value of the first field is "01". Other values are deduced by analogy. In this way, the packets of the different nodes can be isolated through the value of the first field, and there is no need to allocate a different IP address to each node, thereby avoiding a complex configuration transaction.

TABLE 2

| Table of correspondences among values of first fields, ports, nodes, and communication units | | | |
|---|---|---|---|
| Value of a first field | Port | Node | Communication unit |
| 0x00 | 104a | 102a | 105a |
| 0x01 | 104b | 102b | 105b |
| 0x02 | 104c | 102c | 105c |
| . . . | . . . | . . . | . . . |

Optionally, the value of the first field is determined by the connection module. For a related design, refer to the foregoing related description of the packet identifiers.

Alternatively and optionally, the value of the first field may be determined by the node. In a design, when a node accesses a port of the connection module, the connection module may notify the node of a corresponding value of the node, and when sending a packet, the node carries the corresponding value in the first field.

The following describes in detail a method in an embodiment of this disclosure.

Figure 3:
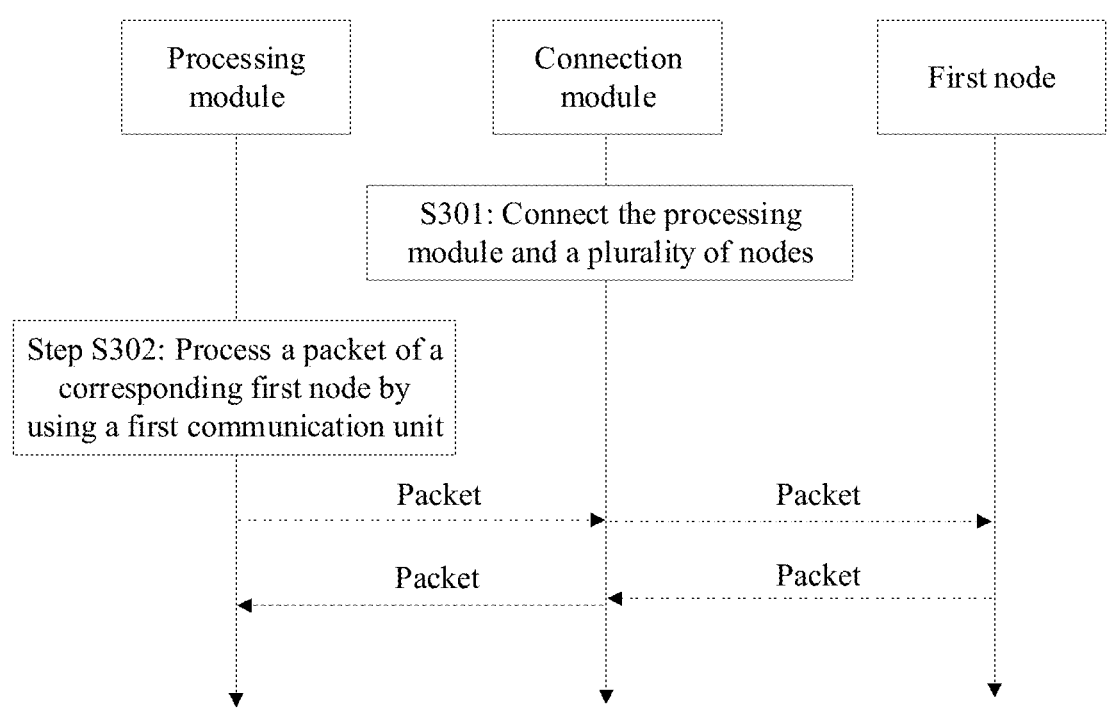
FIG. 3 is a schematic flowchart of a communication method according to an embodiment of this disclosure.

FIG. 3 is a schematic flowchart of a communication method according to an embodiment of this disclosure. Optionally, the method may be applied to the system shown in FIG. 1.

The communication method shown in FIG. 3 includes at least step S301 to step S302.

Step S301: A connection module connects a processing module and a plurality of nodes.

There may be one or more processing modules. There may be one or more nodes. In this embodiment of this disclosure, a quantity of nodes is set to K, where K is an integer greater than 0. For ease of description, the following uses a first node as an example for description.

Optionally, the connection module may include a plurality of ports. The processing module and the node are connected to the connection module through a port. The connection module provides a path between ports. Therefore, the processing module and the node may communicate with each other by using the connection module. For example, a packet sent by the processing module to the first node may be forwarded to the first node by using the connection module. Similarly, a packet sent by the first node to the processing module may be forwarded to the processing module by using the connection module.

Step S302: The processing module processes a packet of a corresponding first node by using a first communication unit.

Further, the processing module includes one or more communication units, which are referred to as L communication units for ease of description. There is a one-to-one correspondence between the communication unit and the node, and the first communication unit corresponds to the first node.

The communication unit is configured to process a packet of a node corresponding to the communication unit. For example, as shown in FIG. 1, a communication unit 105a is configured to process a packet of a node 102a, and a communication unit 105b is configured to process a packet of a node 102b.

In a possible design, a correspondence among a packet identifier, the port, the node, and the communication unit may be established through indication information such as an identifier added to a packet or a value of a specific field in the packet, so that a packet of a corresponding node is processed by using the communication unit. For details, refer to the related descriptions in Table 1 and Table 2 above.

In a possible solution, the connection module may add a packet identifier to a packet that passes through the connection module. For example, the packet that passes through the connection module may include a packet from the first node (referred to as a first packet for ease of differentiation), a packet from the first communication unit (referred to as a second packet for ease of differentiation), and the like. The following describes a packet sending process in this embodiment of this disclosure with reference to FIG. 4.

Figure 4:
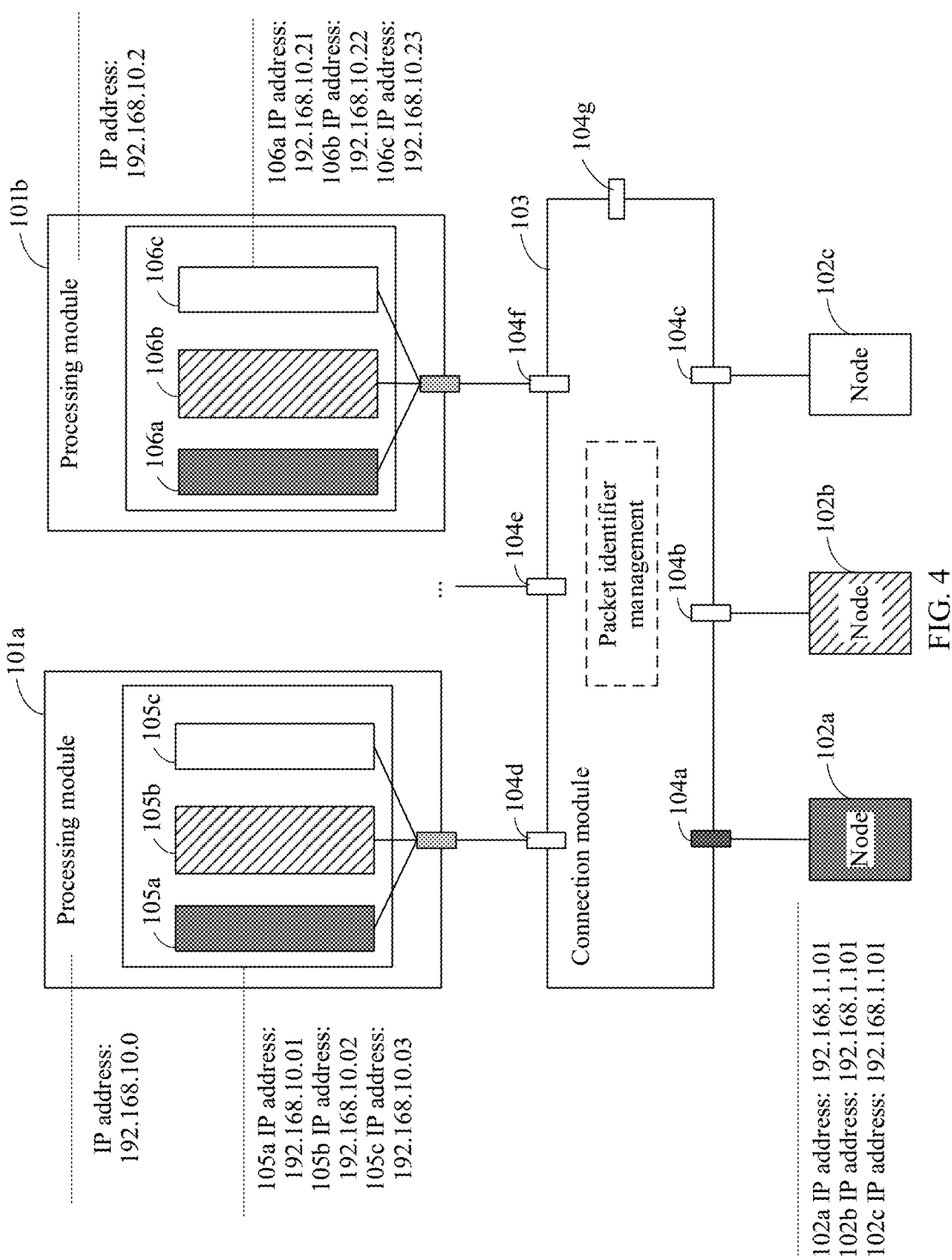
FIG. 4 is a schematic diagram of communication parameters of a communication system according to an embodiment of this disclosure.

FIG. 4 is a schematic diagram of an example of communication parameters of a communication system according to an embodiment of this disclosure. An IP address of a processing module 101a is "192.168.10.0", and IP addresses of the communication unit 105a, the communication unit 105b, and a communication unit 105c in the processing module are "192.168.10.01", "192.168.10.02", and "192.168.10.03", respectively. An IP address of a processing module 101b is "192.168.10.2", and IP addresses of a communication unit 106a, a communication unit 106b, and a communication unit 106c in the processing module are "192.168.10.21", "192.168.10.22", and "192.168.10.23", respectively. IP addresses of a node 102a, a node 102b, and a node 102c are "192.168.1.101", "192.168.1.101", and "192.168.1.101", respectively.

The communication unit processes the packet of the corresponding node in the following possible cases.

Case 1: A packet from the corresponding node is listened to by using the communication unit.

Figure 5:
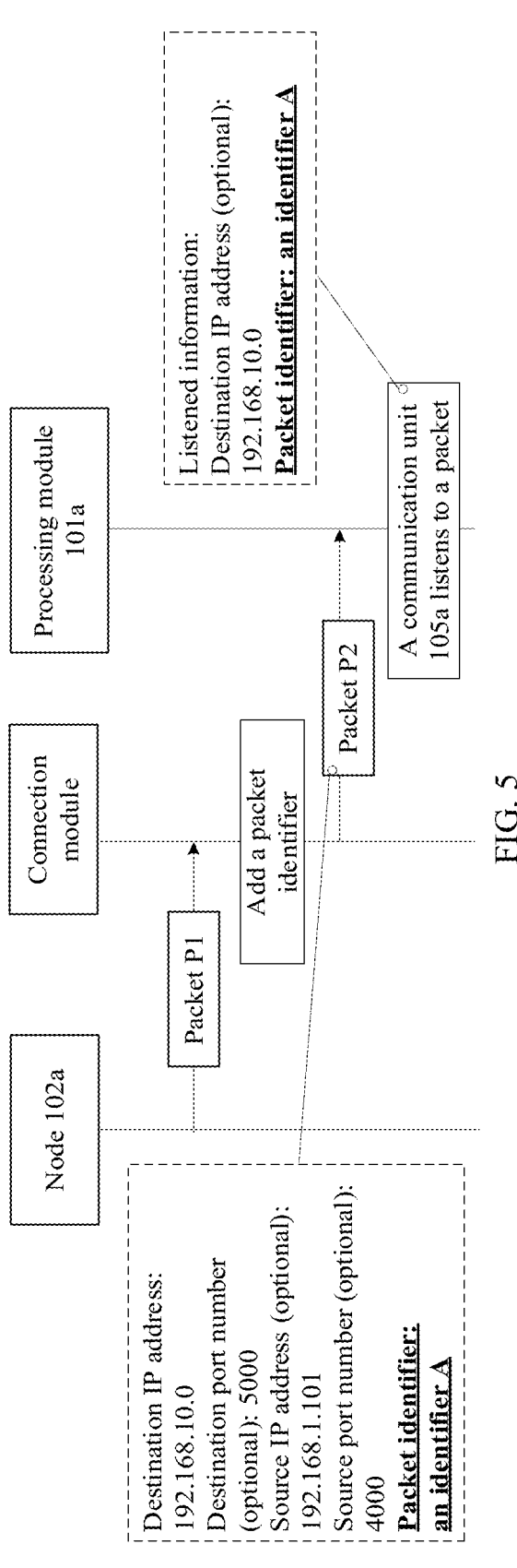
FIG. 5 is a schematic diagram of a packet transmission process according to an embodiment of this disclosure.

FIG. 5 is a schematic diagram of a possible packet transmission process according to an embodiment of this disclosure. A packet sent by the node 102a to the processing module 101a (a destination IP address of the packet is an IP address of the processing module, "192.168.10.0", and the packet is referred to as a packet P1) is transmitted to the connection module through the port, and the connection module may add a corresponding packet identifier (an identifier A) to the packet P1 to obtain a packet P2. The connection module may forward the packet P2 to a port corresponding to the processing module 101a based on a destination IP address, and the communication unit 105a in the processing module 101a is configured to listen to the packet P2 whose packet identifier is the "identifier A", so that the processing module 101a may receive the packet from the node 102a by using the communication unit 105a.

Figure 6:
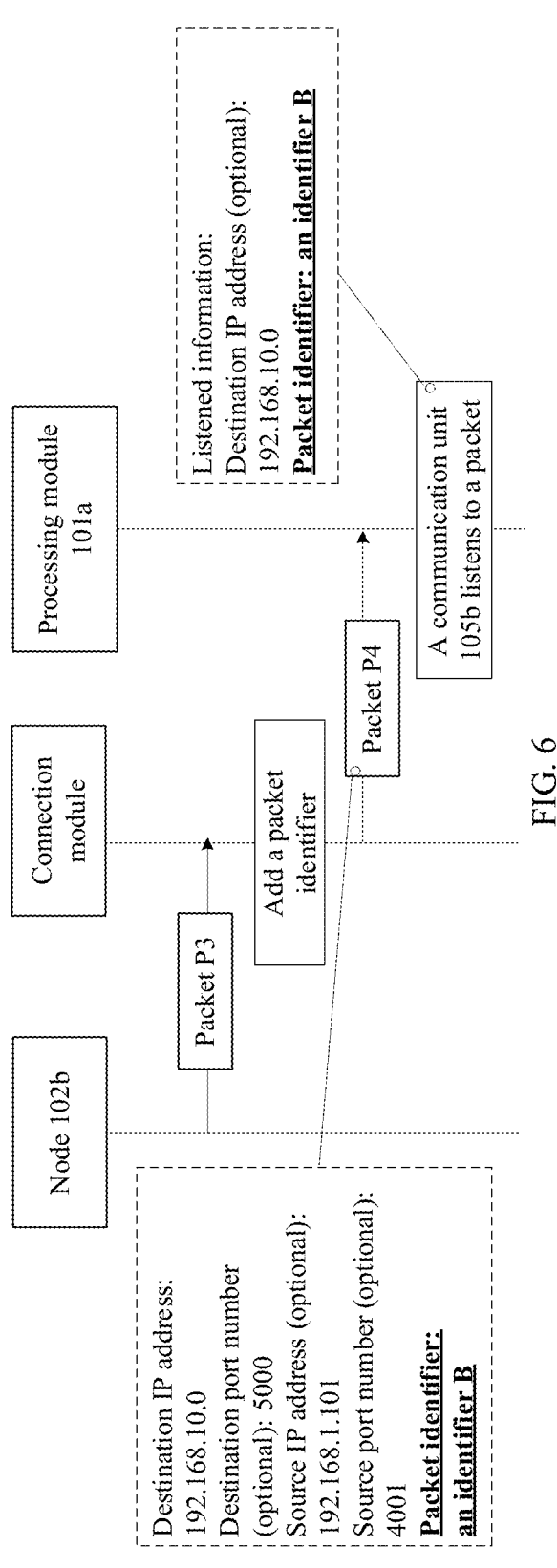
FIG. 6 is a schematic diagram of another packet transmission process according to an embodiment of this disclosure.

Similarly, FIG. 6 is a schematic diagram of a possible packet transmission process according to an embodiment of this disclosure. The node 102b sends a packet (referred to as a packet P3 for ease of differentiation) to the processing module 101a, and the connection module may add a corresponding packet identifier (an identifier B) to the packet P3, to obtain a packet P4. The connection module may forward the packet P3 to a port corresponding to the processing module 101a, and the communication unit 105b in the processing module 101a is configured to listen to the packet P4 whose packet identifier is the "identifier B", so that the processing module 101a may receive the packet from the node 102b by using the communication unit 105b.

For a packet transmission process of another node, also refer to FIG. 5 and FIG. 6 above. In this way, packets of different nodes can be isolated through the packet identifiers, to avoid mutual interference between the packets. As shown in FIG. 5 and FIG. 6, IP addresses of the node 102a and the node 102b may be completely the same (or, certainly, may be different), and information such as a source port number and a destination port number is optional information. Therefore, allocation of IP addresses to the processing module and the node during communication is avoided, and configuration steps in a communication connection establishment process are reduced.

In some communication systems, a location of the port is relatively fixed. For example, the communication system shown in FIG. 1 is used as an example, in which a device in which the communication system is located is a vehicle. If a port 104a is a port at a top location of the vehicle, a port 104b is a port at a front location of the vehicle, and a port 104c is a port at a left location of the vehicle, because the port corresponds to the packet identifier, the packet identifier and a port location may correspond to each other, and nodes at different locations may be differentiated without binding a node location.

In addition, in some possible cases, when the node needs to be replaced due to a limited service life of the node, a fault, or an accident, because the packet identifier corresponds to the port, the packet identifier and the IP address do not need to be reconfigured after the node is replaced. Therefore, the configuration steps in the communication connection establishment process are reduced, efficiency of communication connection establishment is improved, and user experience is improved.

Figure 7:
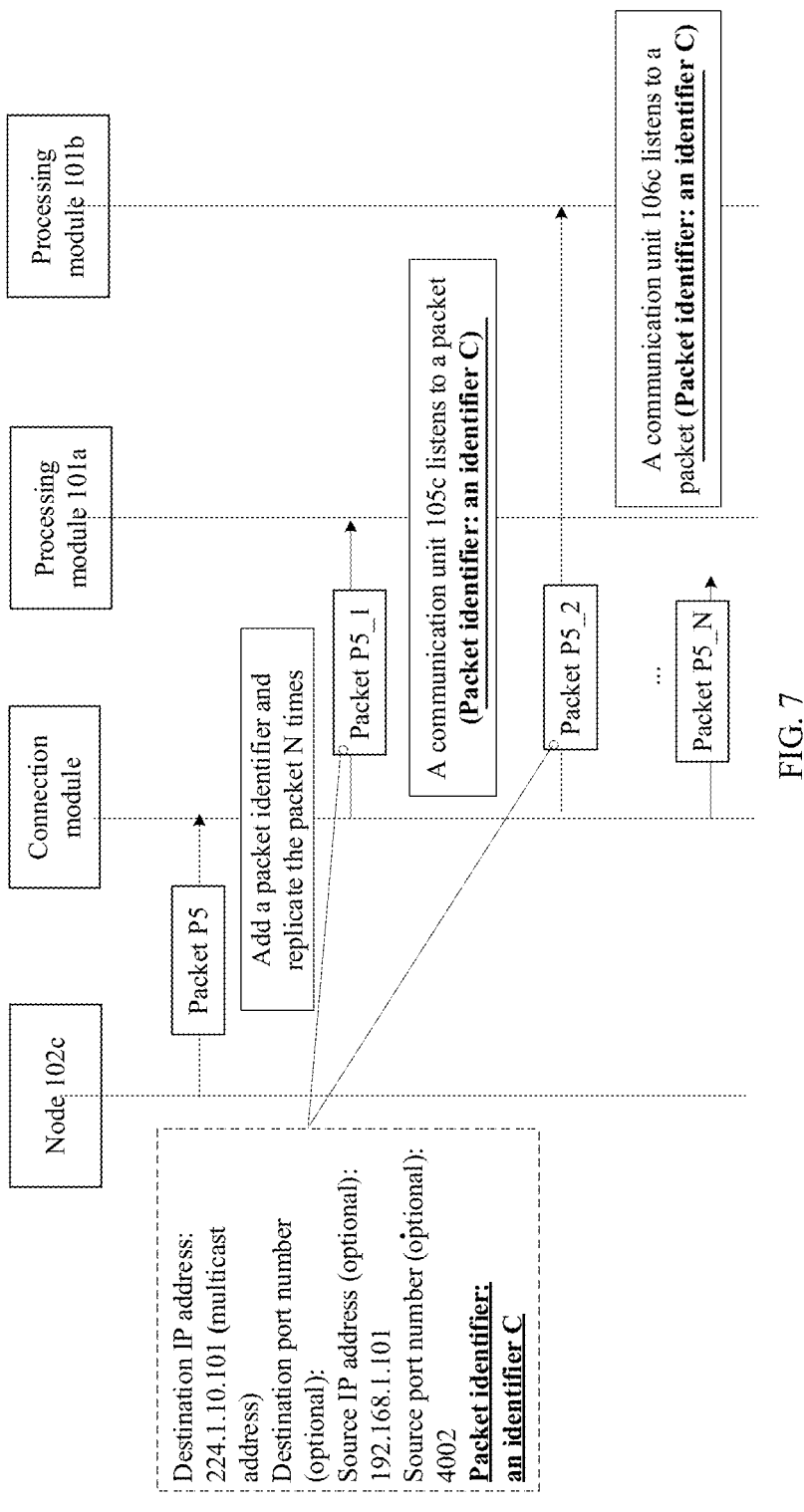
FIG. 7 is a schematic diagram of still another packet transmission process according to an embodiment of this disclosure.

The foregoing describes an example of point-to-point communication between the processing module and the node. The following describes an example of a multicast mode. FIG. 7 is a schematic diagram of a possible packet transmission process according to an embodiment of this disclosure. A multicast packet (referred to as a packet P5 for ease of description) sent by the node 102c may be transmitted to the connection module by using the connection module. For example, a destination IP address of the packet P5 is a multicast address, namely "224.1.10.101". The connection module may add a corresponding packet identifier (an identifier C) to the packet P5 and replicate the packet N times (N is a quantity of processing modules corresponding to the multicast address, $N>0$ or $N≥0$), which are described as a packet P5_1 to a packet P5_N for differentiation. A number is used only to describe the packet rather than representing numbering or sorting of the packet.

The connection module may forward the packet P5_1 to the packet P5_N to a port at which a processing module (for example, the processing module 101a and the processing module 101b) corresponding to the multicast address is located. The communication unit 105c in the processing module 101a is configured to listen to the packet P5_1 whose packet identifier is the "identifier C", so that the processing module 101a may receive the packet from the node 102c by using the communication unit 105c. Similarly, the communication unit 106c in the processing module 101b is configured to listen to a packet P5_2 whose packet identifier is the "identifier C", so that the processing module 101b may receive the packet from the node 102c by using the communication unit 106c.

It should be understood that the foregoing description is provided by using an example in which "replicating the packet N times" is implemented by using the connection module. In a specific implementation process, a function of replicating the packet may also be implemented by another apparatus, for example, the node, another communication apparatus other than the connection module, or the like. For example, in a possible design, the connection module and the processing module are integrated in a communication apparatus (for example, an apparatus such as a VIU or a LAN switch in the vehicle), the connection module is configured to implement a communication-related process (receiving, sending, forwarding, and adding an identifier to the packet), and the processing module is configured to implement a processing-related process (for example, replicate the packet).

A broadcast mode is similar to the multicast mode. A difference is that in the broadcast mode, a corresponding IP address is a broadcast address.

It should be noted that the packet from the first node may be a data packet or a management packet. When the packet from the first node is the management packet, the packet includes but is not limited to an acknowledgment (ACK) and a negative acknowledgment (NACK).

In a possible case, when the processing module communicates with the first node by using TCP/IP or SOME/IP, if the first node sends the data packet to the processing module, the first node may serve as a client, and the processing module (or an application in the processing module) serves as a server side.

Case 2: A packet destined for the corresponding first node is sent by using the communication unit.

Figures 8, 9:
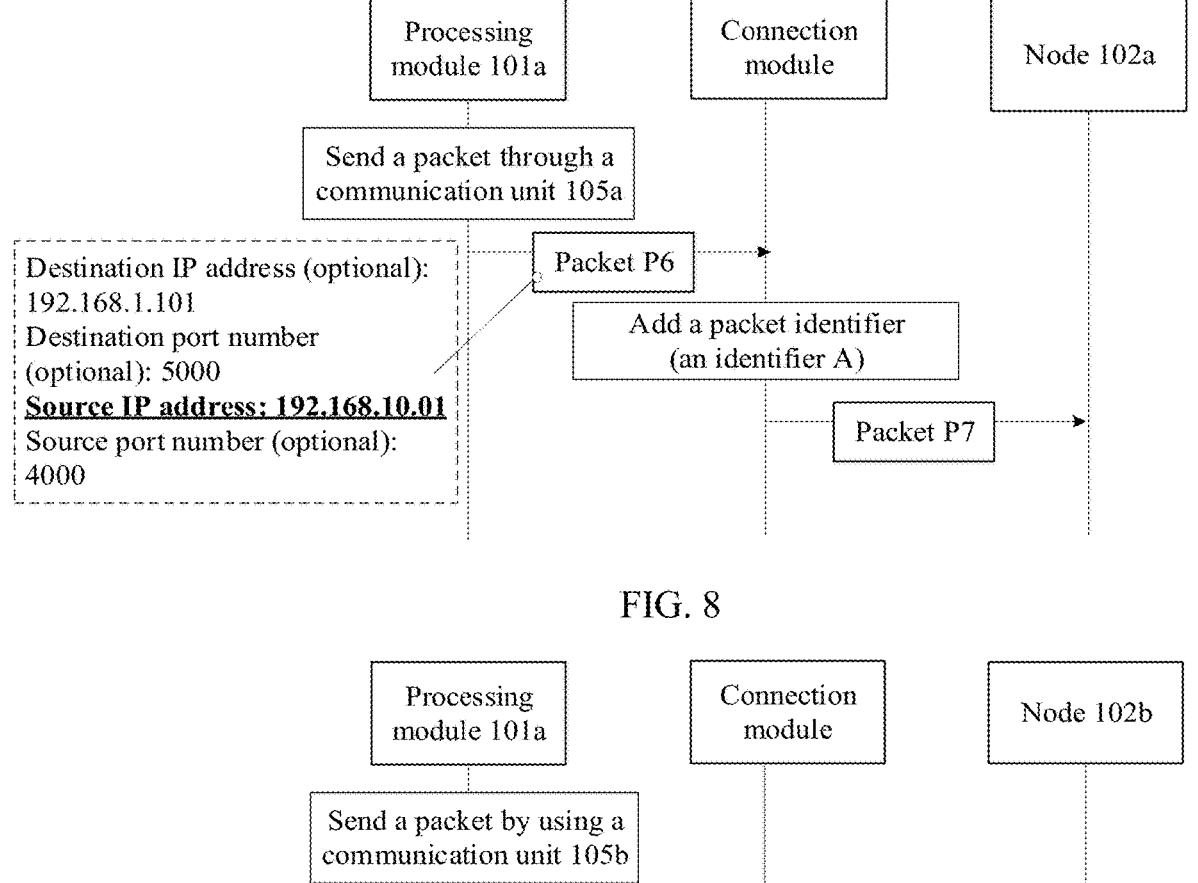
FIG. 8 is a schematic diagram of still another packet transmission process according to an embodiment of this disclosure.
FIG. 9 is a schematic diagram of still another packet transmission process according to an embodiment of this disclosure.

FIG. 8 is a schematic diagram of a possible packet transmission process according to an embodiment of this disclosure. A packet P6 sent by the processing module 101*a* to the node 102*a* is sent by using the communication unit 105*a*. A source IP address (which, optionally, may be replaced with a destination IP address or other information indicating the communication unit) of the packet P6 is an IP address of the communication unit 105*a*. The connection module adds a corresponding packet identifier (an identifier A) to the packet P6, to obtain a packet P7. The connection module may forward the packet P7 whose packet identifier is the "identifier A" to the node 102*a*.

Similarly, FIG. 9 is a schematic diagram of a possible packet transmission process according to an embodiment of this disclosure. A packet P8 sent by the processing module 101*a* to the node 102*b* is sent by using the communication unit 105*b*. The connection module 101*a* adds a corresponding packet identifier (an "identifier B") to the packet P8, to obtain a packet P9. The connection module 101*a* may forward the packet P9 whose packet identifier is the "identifier B" to the node 102*b*.

Figure 10:
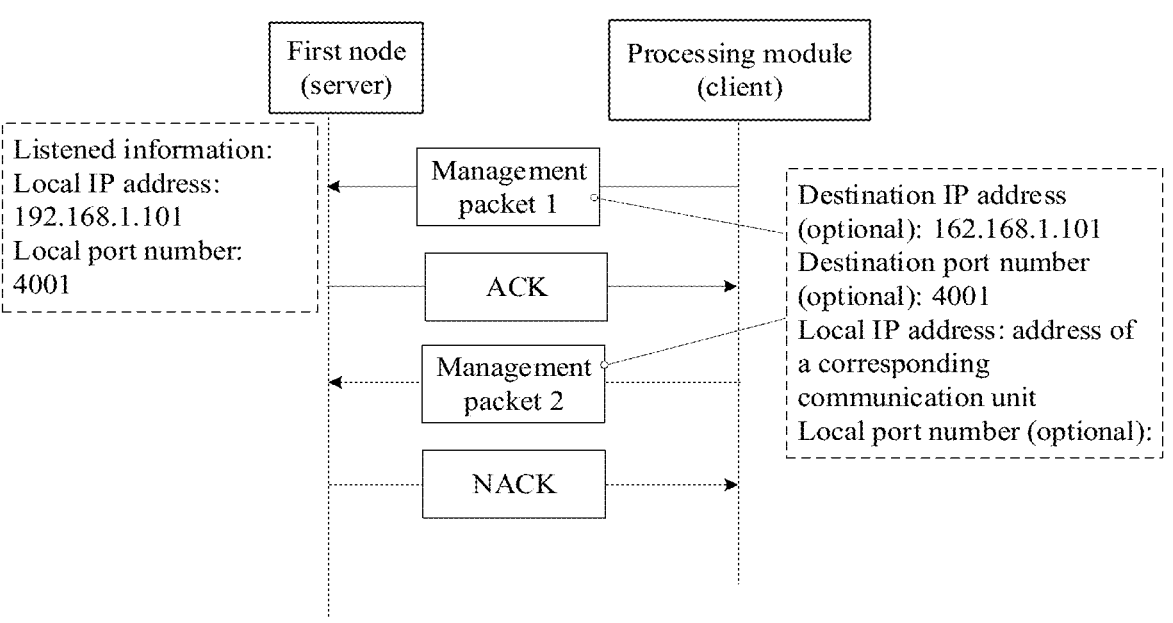
FIG. 10 is a schematic diagram of sending a management packet to a processing module by a node according to an embodiment of this disclosure.

It should be noted that a packet from the processing module may be a data packet or a management packet. When the packet from the processing module is the management packet, the first node may return a feedback packet, for example, an ACK, or a NACK. FIG. 10 is a schematic diagram of a possible case in which a first node sends a management packet to a processing module according to an embodiment of this disclosure. As shown in FIG. 10, the first node may feed back the ACK or the NACK to the processing module.

In a possible case, when the processing module communicates with the first node by using TCP/IP or SOME/IP, if the processing module sends the management packet to the first node, the processing module (or an application in the processing module) may serve as a client, and the first node serves as a server side.

In this embodiment of this disclosure, address information of a plurality of nodes does not need to be configured separately. Even if the address information of the plurality of nodes is completely the same, packets of nodes may be differentiated. In a possible solution, the node can be configured with default address information at delivery. For example, a local MAC address, a local IP address, a local port number, a destination IP address, a destination port number, and the like of the node can be configured by pre-defining or presetting. Therefore, re-configuration is not required during communication. The local IP address is an IP address of the node itself, and refers to an IP address of a sender of a packet in the packet, and may also be referred to as a source IP address. Similarly, the local port number is a number of a port connected to the node. In addition, the local IP address corresponds to a peer IP address. The peer IP address is an IP address of another end of communication. During packet transmission, the peer IP address is also used to indicate an address of a receiver of the packet or an address at which the packet arrives next, and is also referred to as the destination IP address.

In a possible solution, the node may send a configuration information packet to the processing module (or the connection module), to perform configuration initialization. The configuration information packet may include information of user data packet communication, information of user management packet communication, or the like. For example, the configuration information packet includes but is not limited to an IP address, a port number, a MAC address, or the like of the processing module.

In a possible design, when a new node accesses a port, the processing module may create a corresponding communication unit to correspondingly process a packet of the new node.

In some specific implementation processes, the local IP address of the node and a local IP address of the communication unit may not be in a same network segment. Therefore, the node in this embodiment of this disclosure is a node that supports cross-network segment communication. For example, the node is set through factory settings or user settings to communicate across network segments. Further, cross-network segment communication between the node and the communication unit may be implemented through an IP address mask.

It should be understood that, for ease of understanding, the packet identifier is used as an example for description in this embodiment of this disclosure. A person skilled in the art should know that this disclosure is also applicable to other indication information.

The foregoing describes in detail the method in the embodiments of this disclosure. The following provides an apparatus according to an embodiment of this disclosure.

It may be understood that, to implement the functions in the foregoing embodiments of the method, a plurality of apparatuses provided in this embodiment of this disclosure, for example, a communication apparatus, include a corresponding hardware structure, software unit, or a combination of a hardware structure and a software structure for performing the functions. A person skilled in the art should easily be aware that, in combination with units and algorithm steps of the examples described in the embodiments disclosed in this specification, the embodiments of this disclosure can be implemented by hardware or a combination of hardware and computer software. Whether a specific function is performed by hardware or hardware driven by computer software depends on particular applications and design constraints of the technical solutions. A person skilled in the art may implement the foregoing embodiments of the method by using different apparatus implementations in different usage scenarios. It should not be considered that different implementations of the apparatus go beyond the scope of the embodiments of this disclosure.

In the embodiments of this disclosure, the apparatus may be divided into functional units. For example, the functional units may be obtained through division based on corresponding functions, or two or more functions may be integrated into one functional unit. The integrated module may be implemented in a form of hardware, or may be implemented in a form of a software functional unit. It should be noted that, in the embodiments of this disclosure, division into the units is an example, and is merely logical function division. In actual implementation, another division manner may be used.

The following lists several possible apparatuses.

An embodiment of this disclosure provides a processing module. The processing module includes one or more communication units. The processing module is configured to implement the communication method in the foregoing embodiments. For example, the processing module is configured to implement the method on the processing module side in the embodiments in FIG. 1 and FIG. 3.

An embodiment of this disclosure provides a node. The node is configured to implement the communication method in the foregoing embodiments. For example, the node is configured to implement the method on the first node side in the embodiments in FIG. 1 and FIG. 3.

In a possible design, the node may include a sending unit and a receiving unit. Optionally, the node further includes one or more of a processing unit, a sensing unit, and an output unit.

The sending unit may be configured to implement the operations such as sending or forwarding in the foregoing embodiments, and the receiving unit may be configured to implement the operations such as receiving or listening in the foregoing embodiments. The processing unit may be configured to implement the operations such as determining, calculating, generating, or replicating in the foregoing embodiments, and/or be configured to support another process such as packet output in the foregoing embodiments. The sensing unit is configured to obtain sensing information, including but not limited to one or more of an image, a sound, a distance, a speed, light, temperature, or the like. The output unit is configured to implement data output, including but not limited to one or more of displaying, printing, sound playing, peripheral device operation controlling, or the like.

An embodiment of this disclosure provides a connection module. The connection module is configured to implement the communication method in the foregoing embodiments. For example, the connection module is configured to implement the method on the connection module side in the embodiments in FIG. 1 and FIG. 3.

Optionally, the connection module may further include a sending unit, a receiving unit and a processing unit. The sending unit may be configured to implement the operations such as sending or forwarding in the foregoing embodiments, and the receiving unit may be configured to implement the operations such as receiving or forwarding in the foregoing embodiments. The processing unit may be configured to implement the operations such as determining, calculating, generating, or replicating in the foregoing embodiments.

Figure 11:
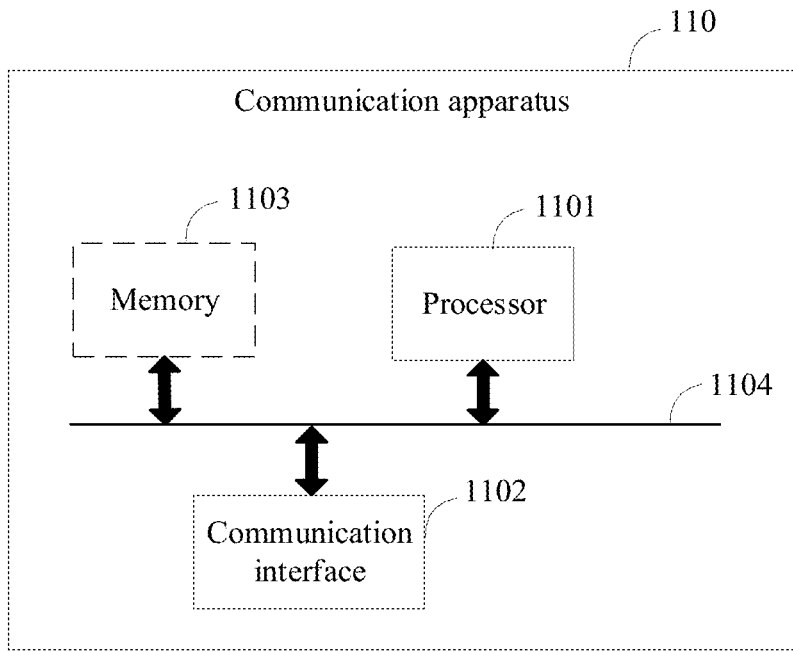
FIG. 11 is a schematic diagram of a structure of a communication apparatus according to an embodiment of this disclosure.

FIG. 11 is a schematic diagram of a structure of a possible communication apparatus 110 according to an embodiment of this disclosure.

The communication apparatus 110 may be an independent device such as a vehicle, an unmanned aerial vehicle, or a robot, or may be a component included in the independent device, for example, a chip, a software module, an integrated circuit, or the like. The communication apparatus 110 may include at least one processor 1101 and a communication interface 1102. Optionally, the communication apparatus may further include at least one memory 1103. Further, optionally, the communication apparatus may further include a connecting circuit 1104. The processor 1101, the communication interface 1102, and/or the memory 1103 are connected through the connecting circuit 1104, and communicate with each other through the connecting circuit 1104, to transfer a control signal and/or a data signal. Optionally, the communication apparatus 110 may further include one or more (not shown in the figure) of a sensing module, an output module, or the like.

(1) The processor 1101 is a module that performs an arithmetic operation and/or a logical operation, and may further include one or more of the following apparatuses: a CPU, an MCU, a GPU, an MPU, an ASIC, an FPGA, a CPLD, a coprocessor (for assisting a CPU in completing corresponding processing and application), an NPU, and/or the like.

(2) The communication interface 1102 may be configured to provide information input or output for the at least one processor. In some possible scenarios, the communication interface 1102 may include an interface circuit, and/or the communication interface 1102 may be configured to receive data sent from the outside and/or send data to the outside. For example, the communication interface 1102 may be a wired link interface including an Ethernet cable and the like, or may be a wireless link (WI-FI, BLUETOOTH, universal wireless transmission, an onboard short-range communication technology, another short-range wireless communication technology, or the like) interface. Optionally, the communication interface 1102 may further include a transmitter (for example, a radio frequency transmitter, an antenna, and the like), a receiver, or the like that is coupled to the interface.

Optionally, if the communication apparatus 110 is an independent device, the communication interface 1102 may include a receiver and a transmitter. The receiver and the transmitter may be a same component or different components. When the receiver and the transmitter are a same component, the component may be referred to as a transceiver.

Optionally, if the communication apparatus 110 is a chip or a circuit, the communication interface 1102 may include an input interface and an output interface, and the input interface and the output interface may be a same interface or different interfaces.

Optionally, a function of the communication interface 1102 may be implemented through a transceiver circuit or a dedicated transceiver chip. The processor 1101 may be implemented by using a dedicated processing chip, a processing circuit, a processor, or a general-purpose chip.

(3) The memory 1103 is configured to provide storage space, and the storage space may store data such as an operating system and a computer program. The memory 1103 may be one or a combination of a random-access memory (RAM), a ROM, an erasable programmable ROM (EPROM), a compact disc (CD) ROM (CD-ROM), and the like.

Functions and actions of modules or units in the communication apparatus 110 listed above are merely examples for description.

Functional units in the communication apparatus 110 may be configured to implement the foregoing communication method. For example, the communication apparatus may be one or more of the processing module, the connection module, the first node, or the like in the embodiments shown in FIG. 1 and FIG. 3. For details, refer to the foregoing description. Herein, detailed descriptions are omitted to avoid repetition.

Optionally, the processor 1101 may be a processor (referred to as a dedicated processor for ease of differentiation) that is specially configured to perform the foregoing method, or may be a processor (referred to as a dedicated processor for ease of differentiation) that invokes a computer program to perform the foregoing method. Optionally, the at least one processor may further include both a dedicated processor and a general-purpose processor.

Optionally, when a computing device includes the at least one memory 1103, if the processor 1101 invokes a computer program to implement the foregoing communication method, the computer program may be stored in the memory 1103.

An embodiment of this disclosure further provides a chip system. The chip system includes a processor and a communication interface. The communication interface is configured to receive and/or send data, and/or the communication interface is configured to provide input and/or output for the processor. The chip system is configured to implement the foregoing signal processing methods, for example, the methods described in FIG. 2, FIG. 6, FIG. 7, and/or FIG. 8.

An embodiment of this disclosure further provides a computer-readable storage medium. The computer-readable storage medium stores instructions, and when the instructions are run on at least one processor, the foregoing signal processing methods are implemented, for example, the methods described in FIG. 2, FIG. 6, FIG. 7, and/or FIG. 8.

An embodiment of this disclosure further provides a computer program product. The computer program product includes computer instructions. When the computer program product is executed by a computing device, the foregoing signal processing methods are implemented, for example, the methods described in FIG. 2, FIG. 6, FIG. 7, and/or FIG. 8.

In the embodiments of this disclosure, the word "example", "for example", or the like is used to represent giving an example, an illustration, or a description. Any embodiment or design scheme described as an "example" or "for example" in this disclosure should not be explained as being more preferred or having more advantages than another embodiment or design scheme. To be precise, use of the word such as "example" or "for example" is intended to present a relative concept in a specific manner.

In the embodiments of this disclosure, "at least one" means one or more, and "a plurality of" means two or more. "At least one of the following items" or a similar expression thereof refers to any combination of these items, including a singular item or any combination of plural items. For example, at least one of a, b, or c may indicate: a, b, c, (a and b), (a and c), (b and c), or (a, b, and c), where a, b, and c may be singular or plural. The term "and/or" describes an association between associated objects, and indicates that three relationships may exist. For example, A and/or B may indicate the following three cases: only A exists, both A and B exist, and only B exists, where A and B may be singular or plural. The character "/" generally indicates an "or" relationship between the associated objects.

In addition, unless otherwise stated, ordinal numbers such as "first" and "second" in the embodiments of this disclosure are for differentiation between a plurality of objects, but are not intended to limit an order, a time sequence, priorities, or importance of the plurality of objects. For example, a first device and a second device are merely for ease of description, and do not indicate a difference of the first device and the second device in terms of a structure and a degree of importance. In some embodiments, the first device and the second device may alternatively be the same device.

According to the context, the term "when" used in the foregoing embodiments may be interpreted as a meaning of "if", "after", "in response to determining", or "in response to detecting". The foregoing descriptions are merely optional embodiments of this disclosure, but are not intended to limit this disclosure. Any modification, equivalent replacement, improvement, or the like made within the concept and principle of this disclosure shall fall within the protection scope of this disclosure.

A person of ordinary skill in the art may understand that all or some of the steps of the foregoing embodiments may be implemented by hardware or a program instructing related hardware. The program may be stored in a computer-readable storage medium. The storage medium may be a ROM, a magnetic disk, a CD, or the like.

What is claimed is:

1. A communication system comprising:
   K nodes comprising a first node, wherein K is an integer greater than zero;
   a processing device comprising L communication components, wherein each of the L communication components corresponds to one of the K nodes, wherein the L communication components comprise a first communication component that is configured to process a first packet of the first node, and wherein L is an integer greater than zero; and
   a connection device configured to:
   couple the processing device and the K nodes; and
   add a first packet identifier to a second packet that passes through the connection device.

2. The communication system of claim 1, wherein the first communication component is further configured to:
   listen to the first packet; or
   send the second packet to the first node.

3. The communication system of claim 1, wherein the connection device comprises M ports, wherein the M ports comprise a first port, wherein the first node is configured to access the connection device through the first port, and wherein the first port and the first communication component correspond to a first identifier.

4. The communication system of claim 3, wherein the connection device is further configured to add the first packet identifier to the first packet, and wherein the first communication component is further configured to listen to the first packet based on the first packet having the first packet identifier.

5. The communication system of claim 4, wherein a destination Internet Protocol (IP) address of the first packet is an IP address of the processing device.

6. The communication system of claim 4, wherein a destination Internet Protocol (IP) address of the first packet is a multicast address or a broadcast address, and wherein the connection device is further configured to:
   obtain N third packets based on the first packet, wherein N is greater than or equal to one; and
   forward the N third packets to a second port that is of the M ports and that corresponds to the destination IP address.

7. The communication system of claim 3, wherein the first communication component is further configured to send a third packet, wherein the connection device is further configured to:

receive the third packet;

add a second packet identifier to the third packet, wherein the second packet identifier is the first identifier; and send, based on the first identifier, the third packet through the first port to the first node.

8. The communication system of claim 7, wherein a local Internet Protocol (IP) address of the third packet is an IP address of the first communication component.

9. The communication system of claim 1, wherein Internet Protocol (IP) addresses of the K nodes are the same when K is an integer greater than one.

10. The communication system of claim 1, wherein the processing device is further configured to:

receive a configuration information packet from the first node, wherein the configuration information packet comprises an Internet Protocol (IP) address of the first node; and create, based on the configuration information packet, the first communication component corresponding to the first node.

11. The communication system of claim 1, wherein the first communication component comprises a virtual device instance, or wherein the connection device comprises a switch.

12. A method implemented by a communication system, wherein the method comprises:

connecting, by a connection device of the communication system, a processing device of the communication system and K nodes of the communication system, wherein the processing device comprises L communication components, wherein each of the L communication components corresponds to one of the K nodes, and wherein K and L are integers greater than zero;

processing, by the processing device, a first packet of a first node of the K nodes using a first communication component of the L communication components; and adding, by the connection device, a first packet identifier to a second packet that passes through the connection device.

13. The method of claim 12, further comprising:

listening, by the processing device, to the first packet using the first communication component; or sending, by the processing device, the second packet to the first node using the first communication component.

14. The method of claim 12, wherein the connection device comprises M ports, and wherein the method further comprises accessing, by the first node, the connection device through a first port of the M ports, wherein the first node is coupled to the first port, and wherein each of the first port and the first communication component corresponds to a first identifier.

15. The method of claim 14, further comprising:

adding, by the connection device, the first packet identifier to the first packet; and listening, by the processing device using the first communication component, to the first packet first packet based on the first packet having the first packet identifier.

16. The method of claim 15, wherein a destination Internet Protocol (IP) address of the first packet is an IP address of the processing device.

17. The method of claim 16, wherein the destination IP address is a multicast address or a broadcast address, and wherein the method further comprises:

obtaining, by the connection device, N third packets based on the first packet; and forwarding, by the connection device, the N third packets to a second port that is of the M ports and that corresponds to the destination IP address.

18. The method of claim 14, further comprising:

receiving, by the connection device from the first communication component, a third packet;

adding, by the connection device, a second packet identifier to the third packet, wherein the second packet identifier is the first identifier; and sending, by the connection device, based on the first identifier, the third packet through the first port to the first node.

19. The method of claim 18, wherein a local Internet Protocol (IP) address of the third packet is an IP address of the first communication component.

20. A computer program product comprising computer-executable instructions that are stored on a non-transitory computer-readable storage medium and that, when executed by at least one processor, cause a communication system to:

connect, using a connection device of the communication system, a processing device of the communication system and K nodes of the communication system, wherein the processing device comprises L communication components, wherein each of the L communication components corresponds to one of the K nodes, and wherein K and L are integers greater than zero;

process, using the processing device, a first packet of a first node of the K nodes using a first communication component of the L communication components; and add, using the connection device, a first packet identifier to a second packet that passes through the connection device.

\* \* \* \* \*